United States Patent
Deuel et al.

(10) Patent No.: US 12,491,765 B2
(45) Date of Patent: Dec. 9, 2025

(54) VEHICLE ENTERTAINMENT INTERFACE SYSTEM AND METHOD

(71) Applicant: DISNEY ENTERPRISES, INC., Burbank, CA (US)

(72) Inventors: Matthew Deuel, Playa Vista, CA (US); Steven M. Chapman, Newbury Park, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 241 days.

(21) Appl. No.: 18/142,371

(22) Filed: May 2, 2023

(65) Prior Publication Data
US 2024/0367514 A1  Nov. 7, 2024

(51) Int. Cl.
*B60K 35/22* (2024.01)
*B60K 35/10* (2024.01)
*B60K 35/28* (2024.01)
*B60K 35/65* (2024.01)

(52) U.S. Cl.
CPC .............. *B60K 35/22* (2024.01); *B60K 35/10* (2024.01); *B60K 35/28* (2024.01); *B60K 35/65* (2024.01); *B60K 2360/164* (2024.01); *B60K 2360/165* (2024.01)

(58) Field of Classification Search
CPC ........ B60K 35/00; B60K 35/22; B60K 35/28; B60K 35/65; B60K 2360/164; B60K 2360/165; B60K 35/10
See application file for complete search history.

(56) References Cited

U.S. PATENT DOCUMENTS

| | | |
|---|---|---|
| 10,970,560 B2 | 4/2021 | Khalfan et al. |
| 12,109,504 B2 | 10/2024 | Deuel et al. |
| 2017/0095742 A1 | 4/2017 | Boyle |
| 2017/0300281 A1* | 10/2017 | Feldman ............... G06F 3/1423 |
| 2020/0151768 A1 | 5/2020 | Dekeyser et al. |
| 2020/0151943 A1* | 5/2020 | Navarrette ............ G02B 27/01 |
| 2022/0084256 A1* | 3/2022 | Wan ......................... G06T 7/73 |
| 2023/0288927 A1 | 9/2023 | Tran |
| 2023/0302372 A1 | 9/2023 | Deuel et al. |
| 2023/0302374 A1 | 9/2023 | Deuel et al. |
| 2024/0388758 A1* | 11/2024 | Miura ................... B60W 50/14 |
| 2024/0424895 A1* | 12/2024 | Wan ....................... B60K 35/00 |

* cited by examiner

*Primary Examiner* — James J Lee
*Assistant Examiner* — Alexander George Matta
(74) *Attorney, Agent, or Firm* — Dorsey & Whitney LLP (57) ABSTRACT

A vehicle entertainment interface is disclosed. In one embodiment, the vehicle entertainment interface includes a programming interface configured to receive a plurality of programs which, when executed, provide respective entertainment experiences to occupants of an passenger vehicle utilizing one or more features of the passenger vehicle; and a vehicle interface configured to identify one or more features of an passenger vehicle, select a program of the plurality of programs based on the identified one or more features of the passenger vehicle, and present an entertainment experience of the entertainment experiences corresponding to the selected program to the occupants of the passenger vehicle utilizing the identified one or more features of the passenger vehicle.

22 Claims, 5 Drawing Sheets

VEHICLE ENTERTAINMENT INTERFACE SYSTEM AND METHOD

FIELD

The present application relates a system for providing entertainment experiences to occupants of passenger vehicles utilizing features of the passenger vehicles and interfacing with various electronic devices, such as those that are integrated with a vehicle.

BACKGROUND

Modern vehicles may include various features which may be utilized to implement various function inside and outside the vehicle as well as to provide entertainment content to occupants of the vehicles. For example, sensors, displays, and other features may be utilize to provide entertainment content and/or to synchronize entertainment content with events and/or structures located outside of the vehicle. Different vehicles may include different sets of such features and/or may use different communications protocols or syntax, such that creating entertainment experiences for a wide variety of vehicles may be time consuming. Further, entertainment content designed for a particular type of vehicle may not be easily scalable to other types of vehicles with different features and/or communicating using different protocols or syntax.

BRIEF SUMMARY

A method is disclosed. In one embodiment, the method includes identifying one or more features of an passenger vehicle; selecting an entertainment experience for presentation utilizing the one or more features of the passenger vehicle based on the identified one or more features of the passenger vehicle; and presenting the entertainment experience to one or more occupants of the passenger vehicle utilizing the identified one or more features of the passenger vehicle.

Optionally, in some embodiments, presenting the entertainment experience includes augmenting an appearance of an object outside of the passenger vehicle using the identified one or more features of the passenger vehicle.

Optionally, in some embodiments, the features of the passenger vehicle include at least one output feature and at least one sensor.

Optionally, in some embodiments, presenting the entertainment experience includes presenting content using the at least one output feature responsive to detection of a condition by the at least one sensor.

Optionally, in some embodiments, the entertainment experience is selected from a plurality of entertainment experiences associated with a location of the passenger vehicle.

Optionally, in some embodiments, presenting the entertainment experience includes presenting the entertainment experience in synchronization with content displayed outside of the passenger vehicle.

Optionally, in some embodiments, the entertainment experience is further selected based on one or more user profiles associated with one or more occupants of the passenger vehicle.

A vehicle entertainment interface is disclosed. In one embodiment, the vehicle entertainment interface includes a programming interface configured to receive a plurality of programs which, when executed, provide respective entertainment experiences to occupants of an passenger vehicle utilizing one or more features of the passenger vehicle; and a vehicle interface configured to identify one or more features of an passenger vehicle, select a program of the plurality of programs based on the identified one or more features of the passenger vehicle, and present an entertainment experience of the entertainment experiences corresponding to the selected program to the occupants of the passenger vehicle utilizing the identified one or more features of the passenger vehicle.

Optionally, in some embodiments, the vehicle interface is configured to present the entertainment experience by providing instructions to the identified one or more features to augment an appearance of an object outside of the passenger vehicle.

Optionally, in some embodiments, the vehicle interface is further configured to generate the entertainment experience by configuring the selected program based on the identified one or more features of the passenger vehicle.

Optionally, in some embodiments, the program is further selected based on one or more of a location of the passenger vehicle, a user profile associated with the passenger vehicle, and content being displayed outside of the passenger vehicle.

Optionally, in some embodiments, the vehicle entertainment experience further includes a translation layer configured to translate the selected program from a first syntax associated with the programming interface to a second syntax associated with a control system of the passenger vehicle.

Optionally, in some embodiments, the vehicle interface is further configured to present the entertainment experience in synchronization with content displayed outside of the passenger vehicle.

One or more non-transitory computer readable media are disclosed. In one embodiment, the one or more non-transitory computer readable media are encoded with instructions which, when executed by one or more processors of a vehicle entertainment interface, cause the vehicle entertainment interface to receive a program providing instructions associated with providing entertainment experiences to occupants of passenger vehicles; identify one or more features of an passenger vehicle; generate an entertainment experience for presentation utilizing the one or more features of the passenger vehicle by configuring the program based on the identified one or more features of the passenger vehicle; and present the entertainment experience to one or more occupants of the passenger vehicle utilizing the identified one or more features of the passenger vehicle.

Optionally, in some embodiments, the one or more features of the passenger vehicle include at least one output feature and at least one sensor.

Optionally, in some embodiments, presenting the entertainment experience includes presenting the content using the at least one output feature and utilizing the at least one sensor to present the content.

Optionally, in some embodiments, presenting the entertainment experience includes presenting the entertainment experience in synchronization with content displayed outside of the passenger vehicle.

Optionally, in some embodiments, the program is further configured based on one or more user profiles associated with one or more occupants of the passenger vehicle.

Optionally, in some embodiments, the instructions further cause the vehicle entertainment interface to translate the program from a first syntax associated with the vehicle entertainment interface to a second syntax associated with a control system of the passenger vehicle.

Optionally, in some embodiments, configuring the program based on the identified one or more features includes selecting instructions of the program corresponding to the identified one or more features.

DETAILED DESCRIPTION

Modern passenger vehicles, such as personal automobiles, may include numerous sensors, output devices, and other features that may be utilized to provide entertainment experiences to occupants inside of the vehicles. Such entertainment experiences may be provided while a vehicle is stationary or while a vehicle is in motion. For example, passenger vehicles may be provided with head up displays, seat heating/cooling systems, haptic feedback in seats, heating and air conditioning systems, lighting systems, automated seat adjustments, and other features on the interior of a vehicle that may be utilized to provide entertainment experiences to occupants of the vehicle. Exterior features, such as headlights, exterior lights, mirrors, sensors, cameras, windshield wipers and sprayers, and the like may also be utilized to provide entertainment experiences. Passenger vehicles may include, for example, vehicles adapted to carry one or more passengers over roads or open, passable terrain (e.g., on-road vehicles). For example, passenger vehicles may include, for example, automobiles, motorcycles, air-based vehicles (e.g., helicopters, airplanes, and the like), watercraft. Such vehicles may include features which may be utilized to provide such entertainment experiences.

Features of passenger vehicles may be similar to those described in U.S. patent application Ser. No. 17/702,960 entitled "Vehicle Entertainment System and Method" and filed Mar. 24, 2022 and U.S. patent application Ser. No. 17/702,998 entitled "Entertainment System for a Vehicle" and filed Mar. 24, 2022 both of which are incorporated by reference herein in their entireties.

Vehicle features can be utilized to provide entertainment experiences for occupants of the vehicle that are synchronized to content displayed externally to the vehicle. Some vehicles may have light detection and ranging systems (LIDAR), radio detection and ranging systems (RADAR), cameras, computer vision capabilities, or other features capable of recognizing content being played at the external display. For example, sensors of vehicles may be able to recognize a particular movie or other content being played exterior to the vehicle and may then use the vehicle features to provide an entertainment experience synchronized to the movie. Various features of the vehicle may be utilized to provide content or output synchronized to various aspects of the movie, such as heating, ventilation, and air conditioning (HVAC) systems (e.g., turning on cold air flow during scenes taking place in cold weather, turning on heat for scenes in hot weather, use of head up or other displays to show additional content (e.g., characters, environmental features, and/or other projections) synchronized to scenes of the movie, and the like. Similar capabilities may be utilized to provide entertainment experiences synchronized to particular advertisements, roadside attractions, geographical locations, and the like.

For example, passenger vehicles may be equipped with projection or other systems that may augment objects outside of the vehicle, such that occupants of the vehicle are able to view an enhanced version of the object. For example, actors wearing motion capture suits or movable objects (e.g., animatronics or robots) may be positioned outside of a vehicle in conjunction with a movie, play, or other external content. Features of the vehicle may detect such actors or objects and utilize projection systems of the vehicle to enhance the appearance of the same (e.g., making the actors or objects appear in particular costumes and the like). Props or other external features, such as signs, open pavement, and the like may be similarly augmented using various systems available in some passenger vehicles, such that the passenger vehicles may be utilized to provide a variety of enhanced experiences to occupants of the vehicle.

Features of vehicles may further be used in touring, sightseeing, or other similar applications. For example, entertainment experiences may be developed for particular locations, such as parks, nature reserves, driving routes through cities or historic areas, and the like. In such examples, features of passenger vehicles may be utilized to provide additional information about the area, such as geological, historical, or other relevant information. Accordingly, entertainment experiences may utilize displays or other outputs within the vehicle (e.g., speakers or other audio outputs) to provide such information. For example, views of what an area looked like in another geological or historical area may be provided using a head up display, infotainment system, or the like, while speakers or other audio outputs are utilized to provide narration or other information to occupants of the vehicle.

Developers and/or other content creators or providers may have difficulty utilizing features of passenger vehicles as described above due to proprietary interfaces, differing access requirements between models or manufacturers, and the like. To allow creators to more efficiently access hardware controlling various features of passenger vehicles, vehicle entertainment interfaces provided herein may provide an application programming interface (API) allowing such creators to access hardware or at least communicate with such hardware of various passenger vehicles for performing various functions during such entertainment experiences. The API may provide a common framework for programming such entertainment experiences across vehicle manufacturers, vehicle models, and the like, allowing creators to more easily create such entertainment experiences without addressing or directly utilizing differing protocols for accessing such hardware. The common framework may further allow for immersive entertainment experiences synchronized with pre-existing or pre-recorded content, content displayed outside of an passenger vehicle (e.g., a movie playing at a drive-in movie theater or similar location), advertisements (e.g., on billboards), and the like.

Further, content creators and/or developers may have difficulty configuring entertainment experiences such as those described above for display across vehicles having different available features which may be used to provide such experiences to occupants of vehicles. For example, it may be time consuming to configure content for viewing through a head up display, an infotainment system, or devices (e.g., smartphones, tablets, and the like) utilized by occupants of the vehicle depending on the features available for a particular vehicle. Similarly, when providing an entertainment experience to a vehicle, it may be difficult to determine what features are available for use in providing such experiences. Vehicle entertainment interfaces provided herein may further simplify creation and presentation of entertainment experiences across a variety of passenger vehicles having different available features. For example, a vehicle entertainment interface may determine the available features in a particular passenger vehicle and provide an entertainment experience utilizing the available features, such that creators do not have to define experiences for every possible combination of features and/or for particular makes and models of vehicles.

In accordance with the above disclosure, the vehicle entertainment interface allows for provision of entertainment experiences to a wide variety of passenger vehicles, where such entertainment experiences are tailored to the vehicle based at least on features of the vehicle. The vehicle entertainment interface may allow content and entertainment providers to generate and provide entertainment experiences for vehicles that are able to utilize new features available in some vehicles, while also providing a different version of the entertainment experience to other vehicles with different features.

Figure 1:
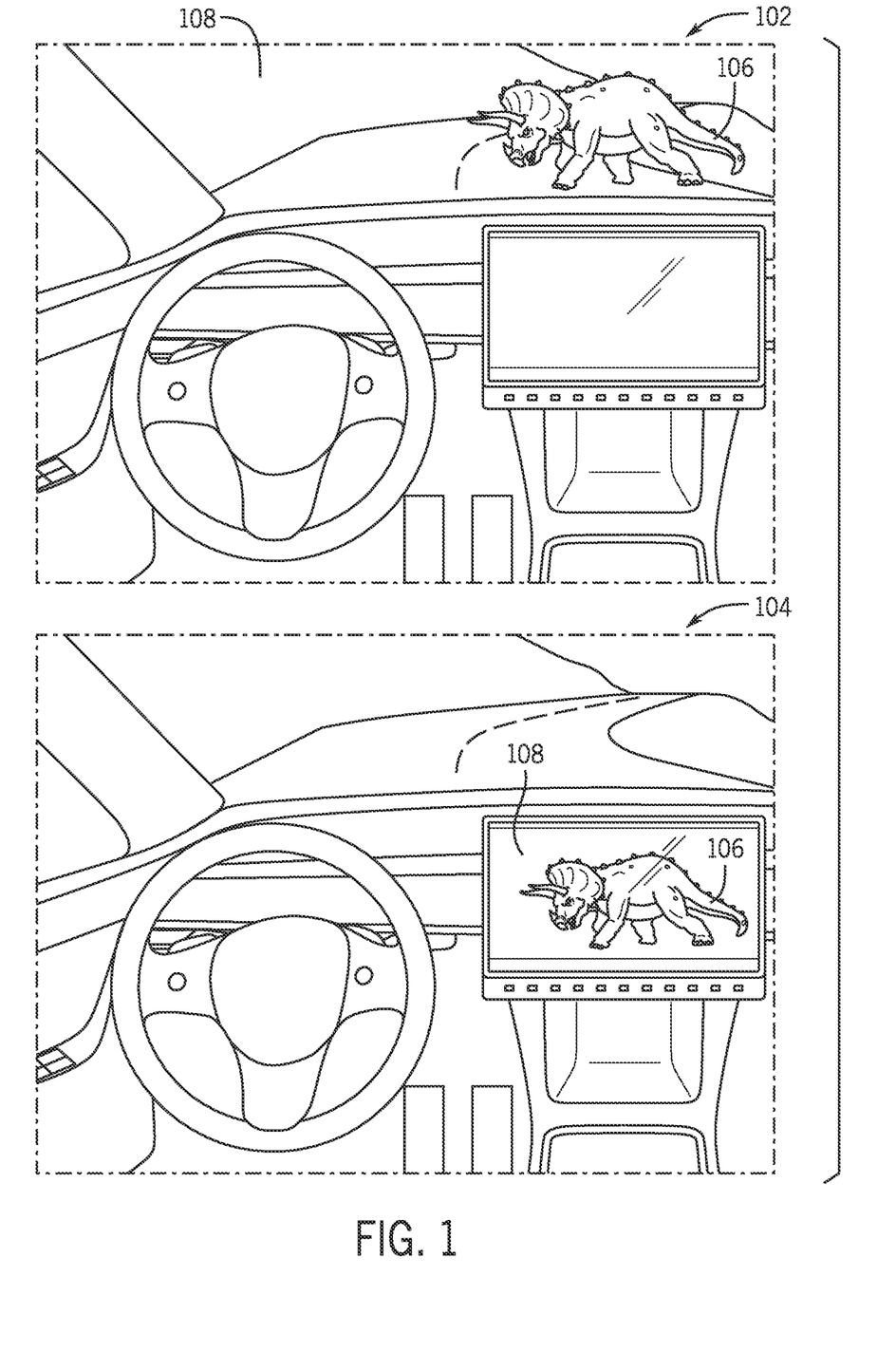
FIG. 1 illustrates entertainment content viewed at various vehicles utilizing a vehicle entertainment interface.

Turning to the figures, FIG. 1 illustrates content of an entertainment experience being provided to two vehicles with differing features available. For example, the entertainment experience may be generally presented as a vehicle drives through a particular area. The entertainment experience may provide vehicle occupants with information and imagery showing how the area looked in a previous era. In FIG. 1, the content 106 shows a content object (e.g., a dinosaur) as being present in the area. For a first vehicle interior 102 equipped with a head up display in the windshield, the content 106 may be displayed using the head up display to make the content object appear as though it is outside of the vehicle. A second vehicle interior 104 may not be equipped with a head up display but may include an infotainment system including a display 108 capable of displaying the content 106. Alternatively or in addition, user devices such as smartphones (not shown) may be linked to an infotainment system (e.g., by a wired or wireless connection) and used to display the content 106.

In various examples, using the vehicle entertainment interface described herein, a content creator or developer may design or develop entertainment experiences that may be adapted to vehicles with different features by the vehicle entertainment interface. For example, to provide the content 106 shown in FIG. 1, a developer may indicate that the content object (e.g., dinosaur) should be displayed to occupants of a vehicle at a certain location or at a certain time (e.g., measured by global positioning system coordinates or other geolocation method) using available features of the vehicle. Accordingly, when a vehicle has a head up display, the content 106 may be displayed with the head up display. When the vehicle does not have a head up display, the creator may specify alternate features that may be utilized for displaying the content 106, such as displays of an infotainment system, displays of user devices, and the like. The vehicle entertainment interface may, when providing the programmed entertainment experience, determine which features are available for a particular vehicle and display the content 106 accordingly, without the developer having to program separate entertainment experiences for different vehicles and without having to utilize proprietary or otherwise varying APIs provided by different vehicles.

Though FIG. 1 shows entertainment experiences as viewed by occupants inside of the vehicles, the vehicle entertainment interface may, in some examples, provide content to users or others outside of the vehicle. For example, where a vehicle includes features such as displays, projectors, or the like, the vehicle entertainment interface may present content which alters the appearance of the vehicle from outside of the vehicle. For example, window displays may be utilized to alter the appearance of occupants of the vehicle for entertainment purposes. Occupants may, for example, appear from the outside of the vehicle to be wearing helmets or other headwear. In such examples, computer vision and/or other machine learning may be utilized to present such content. Such window displays may further be utilized, under certain conditions, to provide information (e.g., emergency information) about occupants of the vehicle (e.g., when features of the vehicle detect a collision).

Though FIG. 1 is described with respect to visual content, other types of content may be provided by the vehicle entertainment interface as part of an entertainment experience. For example, the vehicle entertainment interface may provide an entertainment experience including audio output (which may be included with or separate from the visual aspects, e.g., synchronized with the visual content or a separate presentation). In instances when a vehicle has directional speakers, audio content may be output to sound to occupants like it is originating a particular location relative to the occupants. Where a vehicle does not have directional speakers, the same audio content may be provided using other speakers available in the vehicle. Other features which may be utilized to provide content include, for example, lighting (both interior and exterior), climate control systems, seating features (e.g., massaging seats), user devices in communication with the vehicle (e.g., smart phones connected to a vehicle via Bluetooth® connection), and the like. Bluetooth is a trademark or registered trademark of the Bluetooth Special Interest Group (SIG) in the United States and other countries.

Figure 2:
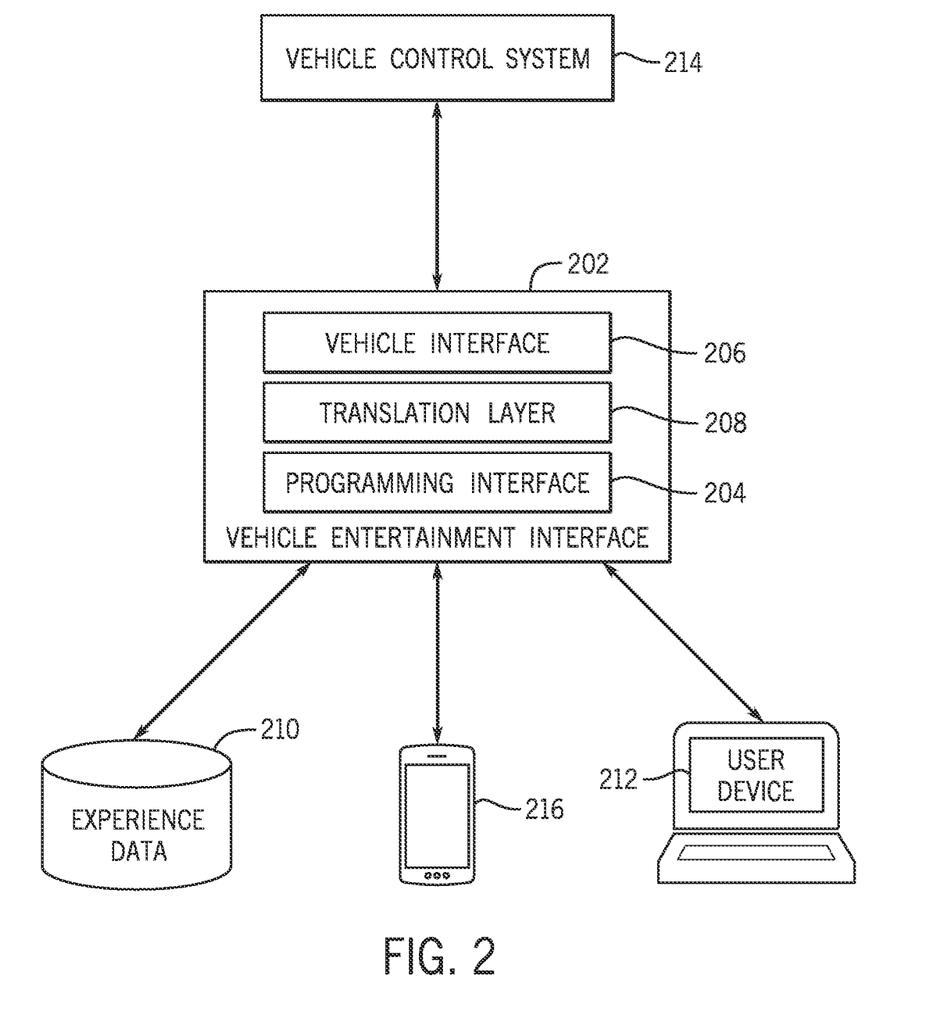
FIG. 2 is a block diagram of an example vehicle entertainment interface, in accordance with various embodiments of the disclosure.

FIG. 2 is a block diagram of an example vehicle entertainment interface 202 and various components in communication with the vehicle entertainment interface 202. Generally, the vehicle entertainment interface 202 provides a toolkit allowing creators to develop content and/or entertainment experiences using passenger vehicles. For example, the vehicle entertainment interface 202 may provide an abstraction layer to access software and/or hardware of vehicles to provide entertainment experiences using the vehicles. In addition to being a convenience for developers, vehicle manufacturers may not wish to expose a direct interface to the vehicle control system 214 for a variety of reasons.

For example, the vehicle entertainment interface 202 may provide a programming interface 204, allowing users to create programs or routines specifying entertainment experiences to be provided using features of passenger vehicles. The vehicle entertainment interface 202 may further provide a vehicle interface 206 which may communicate with software and/or hardware of various vehicles to determine available features and/or to provide entertainment experiences to the vehicles by communicating with such software and/or hardware. A translation layer 208 of the vehicle entertainment interface 202 may access programs for entertainment experiences (e.g., designed or provided using the programming interface 204) and configure such programs for a particular make and model of vehicle and/or a particular set of features available for utilization to provide an entertainment experience. The translation layer 208 may perform additional functions, such as validating subscriptions (e.g., to media or car infotainment services), process purchases of downloadable or other content, access user profiles, validate users, access location information, and the like.

The vehicle entertainment interface 202 may be implemented using various combinations of computing resources. In various examples, the vehicle entertainment interface 202 may be implemented by one or more servers, cloud computing resources, and/or other computing devices. For example, the vehicle entertainment interface 202 may include or utilize one or more hosts or combinations of compute resources, which may be located, for example, at one or more servers, cloud computing platforms, computing clusters, and the like. The vehicle entertainment interface 202 may utilize various processing resources to facilitate creation and presentation of entertainment experiences utilizing passenger vehicles. For example, the vehicle entertainment interface 202 may utilize or include one or more processors, such as a CPU, GPU, and/or programmable or configurable logic. The vehicle entertainment interface 202 may further include memory and/or storage locations to store program instructions for execution by the processor and various data utilized by the vehicle entertainment interface 202. In various examples, the vehicle entertainment interface 202 may interface with and/or include third party software development kits (SDKs) and/or platforms, such as Android SDK, NVIDIA DRIVE SW, Snapdragon Cockpit platform, and others.

The vehicle entertainment interface 202 may include various components executing on various computing resources. In various examples, such computing resources may communicate with one another via a private subnet, hardwired communications, and/or may execute within a cloud environment within a container, virtual machine, System on a Chip (SOC), unified computing platforms, or other execution environments associated with the vehicle entertainment interface 202. Computing resources used by the vehicle entertainment interface 202 may be dynamic. That is, the processors, memory, and/or other compute resources allocated to the vehicle entertainment interface 202 may change over time, such as based on resource usage of the vehicle entertainment interface 202. For example, when more requests are made to the vehicle entertainment interface 202, additional processors may be allocated to the vehicle entertainment interface 202. In some examples, some or all of the computing resources utilized by the vehicle entertainment interface 202 may be located outside of a cloud computing environment, such as at a local server, individual user devices, and/or local compute resources dedicated to the vehicle entertainment interface 202.

Generally, the components shown in FIG. 2 may implement various functions of the vehicle entertainment interface 202. In the example shown in FIG. 2, the vehicle entertainment interface 202 includes functionality for a programming interface 204, a vehicle interface 206, and a translation layer 208. Collectively, such components provide the ability for the vehicle entertainment interface to provide an abstraction layer for the design and provision of entertainment experiences for passenger vehicles.

The vehicle entertainment interface 202 may implement a programming interface 204. The programming interface 204 may generally provide an API for accessing software, hardware, and/or other features of various vehicles in a standardized manner. For example, the programming interface 204 may be accessible by various user devices for programming and/or design of entertainment experiences utilizing features of passenger vehicles. In various examples, the programming interface 204 may provide a software development kit (SDK) or similar service which may be accessible by a user device in communication with the vehicle entertainment interface 202 to program or design entertainment experiences using features of passenger vehicles. The API provided by the programming interface 204 may provide a common protocol for accessing and utilizing vehicle features across manufacturers, models, communications protocols, and the like. For example, the programming interface 204 may provide common syntax for accessing features of vehicles (e.g., the same syntax may be utilized to provide commands to similar features across vehicle manufacturers, models, and the like). Accordingly, a user may program or design entertainment experiences for a wide variety of vehicles without directly using the protocols or APIs provided by vehicle manufacturers. Because designers or programmers do not have to directly engage with the differing protocols, the design of entertainment experiences using passenger vehicles becomes more accessible and scalable using the vehicle entertainment interface 202.

In some examples, content creators and/or programmers may utilize the API provided by the programming interface 204 to generate programs which, when configured or translated by the vehicle entertainment interface 202, provide instructions for entertainment experiences for occupants of passenger vehicles. For example, a content creator or developer may utilize the API provided by the programming interface 204 to generate programs which, when configured and executed, provide entertainment experiences synchronized to external content, such as pre-existing movies, advertisements, and the like. For example, a user may specify desired effects or outputs at various time codes of the external content. In some examples, the user may specify alternative features to provide such outputs depending on the features available at a particular vehicle. For example, a user may specify that visual content should be displayed on a head up display where available and, if no head up display is available, should be displayed using a display of an infotainment system, a display of a user device of an occupant of the vehicle, and/or an audio output (e.g., if no visual display is available and/or if a user requests descriptive audio). Accordingly, the API may be utilized to provide instructions for entertainment experiences without having to provide separate programming for individual vehicles or feature sets.

The translation layer 208 may generally configure programs generated using the programming interface 204 to create entertainment experiences for particular passenger vehicles. The translation layer 208 may access an identifier of a vehicle and/or a listing of particular features available for a particular vehicle. For example, the translation layer 208 may access the vehicle identification number (VIN) of a vehicle to obtain information about the vehicle. The translation layer 208 may then select outputs to provide as part of an entertainment experience based on the features available in the particular vehicle. In some examples, the translation layer 208 may further translate programs provided via the programming interface 204 to a format used for communication with a particular vehicle.

The vehicle interface 206 may generally communicate with vehicles utilizing the vehicle entertainment interface 202 to, for example, provide entertainment experiences tailored to such vehicles. For example, the vehicle interface 206 may communicate configured or selected entertainment experiences from the vehicle entertainment interface 202 to passenger vehicles in communication with the vehicle entertainment interface 202. Additionally, the vehicle interface 206 may further provide other components of the vehicle entertainment interface 202 with information about a vehicle. For example, the vehicle interface may obtain make and model information for a vehicle and may communicate such information to the translation layer 208 to allow the translation layer to configure an entertainment experience for the particular vehicle.

In various examples, the vehicle interface 206 may be configured for use of multiple protocols for communicating with vehicles in communication with the vehicle entertainment interface 202. For example, some types of vehicles may be capable of using custom JSON files while others may be able to communicate via a dongle. The vehicle interface 206 may utilize the vehicle information to determine communication capabilities and select an appropriate communication protocol for the passenger vehicle utilizing the vehicle entertainment interface 202. The vehicle interface 206 may further provide a secure communications interface to passenger vehicles utilizing the vehicle entertainment interface 202. For example, the vehicle interface 206 may provide a key to the vehicle control system 214 before the vehicle control system 214 accepts instructions and/or commands from the vehicle interface 206. In some examples, occupants of a vehicle may physically place a component (e.g., a custom dongle for a control area network (CAN) port or on-board diagnostics (OBD)-II port) in the vehicle for communication with the vehicle interface 206. In various examples, the vehicle interface 206 may execute a handshake protocol or other method of verification before the vehicle control system 214 accepts instructions and/or commands from the vehicle interface 206.

The vehicle entertainment interface 202 may utilize and/or store various types of data. For example, the vehicle entertainment interface 202 may store and/or access experience data 210. Experience data 210 may include stored programs created using the programming interface 204, details regarding features available in specific vehicles, and the like. Experience data 210 and/or other data stored or utilized by the vehicle entertainment interface 202 may be stored at various locations local to and/or accessible by the vehicle entertainment interface 202. For example, such data may be stored at one or more databases or other data stores at cloud locations, remote storage, or the like.

Generally, the vehicle entertainment interface 202 may be in communication with various external systems to facilitate the design and provision of entertainment experiences for passenger vehicles. For example, user devices 212 and/or 216 may be utilized to access the vehicle entertainment interface 202. The user device 212 and/or other user devices may be devices belonging to developers and/or content creators accessing the vehicle entertainment interface to develop entertainment experiences for passenger vehicles via the programming interface 204 of the vehicle entertainment interface 202. Other user devices, such as user device 216 may belong to occupants of passenger vehicles in communication with the vehicle entertainment interface 202 and may be utilized to provide settings associated with users and/or a particular vehicle, select entertainment experiences, act as features of the passenger vehicle (e.g., by providing content to occupants of the vehicle as part of the entertainment experience), and the like.

Generally, user devices 212, 216, and/or other user devices in communication with the vehicle entertainment interface 202 may be devices belonging to end users, such as content creators or other parties designing and/or programming entertainment experiences, vehicle occupants, and the like. For example, user devices 212 may access the programming interface 204 in order to design or program entertainment experiences. In some examples, the vehicle entertainment interface 202 may provide a user interface or application to such devices to utilize the vehicle entertainment interface for such design. For example, the vehicle entertainment interface may provide an SDK that may be accessed on the user device 212 to complete design or programming of entertainment experiences to be provided to end users in passenger vehicles using the vehicle entertainment interface 202. In some examples, a new entertainment experience could be designed and/or selected directly using the entertainment interface 202.

In other examples, the user device 216 and/or other user devices may be utilized by occupants of passenger vehicles in order to interact with the vehicle entertainment interface 202, to receive or display content as part of an entertainment experience, and the like. For example, the vehicle entertainment interface 202 may provide a user interface, website, and/or mobile application available at the user device 216 to interact with the vehicle entertainment interface 202. Accordingly, a user may, via the user device 216, select a particular entertainment experience from a plurality of available entertainment experiences, select features of an passenger vehicle accessible by the vehicle entertainment interface 202 for use, and/or update user profile information which may be utilized by the vehicle entertainment interface 202 in selecting and/or configuring an entertainment experience. For example, a user profile may be configured with a parental control or other age restricted access parameters, which may cause the vehicle entertainment interface 202 to offer and/or select experiences compliant with such age restrictions. User profiles may include additional information, such as accessibility settings, which may affect how the vehicle entertainment interface 202 configures an entertainment experience. For example, the vehicle entertainment interface 202 may configure an entertainment experience to use a head up display to provide closed captioning text for users with hearing difficulties.

The user device 216 may be utilized to select a particular entertainment experiences from a listing of available entertainment experiences for a particular location, external content, and the like. In some examples, entertainment experiences (or portions of entertainment experiences) may be anchored to particular objects, GPS coordinates and the like. In one such example, particular advertising content may be presented to occupants of the vehicle when passing a particular billboard. In another example, a vehicle driving on a scenic roadway may be able to choose between entertainment experiences specific to the roadway. For example, passengers of the vehicle may choose between an entertainment experience providing information about the geology of the area and an entertainment experience narrating and displaying stories as the vehicle travels along the roadway. In some examples, the vehicle entertainment interface 202 may select and/or suggest particular entertainment experiences based on user preferences (e.g., information stored in a user profile), user history (e.g., selecting experiences similar to those selected by the user in the past), user information (e.g., experiences appropriate based on age or other demographic information of occupants of the passenger vehicle), and the like. The vehicle entertainment interface 202 may further select or configure entertainment experiences based on other characteristics of the user device 216, such as streaming subscriptions associated with the user device 216, and the like.

In some examples, the user device 216 and/or other user devices of occupants of an passenger vehicle may be utilized by the vehicle entertainment interface 202 as features of the passenger vehicle. For example, where a user device 216 is communicatively connected to an passenger vehicle (e.g., via a wired data connection, BLUETOOTH connection, connection to a WiFi network provided by the vehicle, or the like), the user device 216 may be accessible by software of the vehicle and, accordingly, may be utilized by the vehicle entertainment interface 202 to provide entertainment experiences. For example, a display of a user device 216 may be utilized to provide content (e.g., audio and/or video content) for an entertainment experience. Sensors and/or other elements of a user device 216 (e.g., cameras, microphones, and the like) may be utilized by the vehicle entertainment interface 202 to select and/or configure entertainment experiences. For example, cameras on user devices 216 may be utilized by the vehicle entertainment interface 202 to detect certain users to provide entertainment experiences geared towards the user's demographic and/or interests. In some examples, the vehicle entertainment interface 202 may utilize cameras on user devices 216 in conjunction with other cameras or sensors available inside of the vehicle to provide entertainment experiences.

In various implementations, the user devices 212 and 216 and/or other user devices in communication with the vehicle entertainment interface 202 may be implemented using any number of computing devices including, but not limited to, a computer, a laptop, mobile phone, smart phone, tablet, wearable device (e.g., AR/VR headset, smart watch, smart glasses, or the like), smart speaker, vehicle, or other devices. Generally, the user devices 212 and 216 may include one or more processors, such as a central processing unit (CPI) and/or graphics processing unit (GPU). The user devices may generally perform operations by executing executable instructions (e.g., software) using the processor(s).

The vehicle entertainment interface 202 may further communicate with various vehicle control systems 214. Vehicle control systems 214 may generally provide access to hardware (e.g., features) of a vehicle and/or software providing access to such hardware. For example, vehicle control systems 214 may provide access to control features of a vehicle such as head up displays, infotainment systems, audio output, radio tuning, heating or air conditioning, interior and/or exterior lighting, seat settings, windshield wipers, user devices in communication with a vehicle, sunroofs, moon roofs, window controls, and the like. In some examples, the vehicle control systems 214 may further provide an interface to an autonomous driving system for an autonomous vehicle. Vehicle control systems 214 may further provide information collected by features of the vehicle, such as input to interior or exterior cameras, input from sensors (e.g., proximity sensors embedded in the vehicle), and the like. Other information collected by features of the vehicle may include user input allowing a user to interact with an entertainment experience, such as steering wheel input, buttons on the interior of the vehicle, input to user devices, and the like.

In some examples, information collected by features of the vehicle may be utilized to trigger or otherwise begin certain entertainment experiences or specific content of entertainment experiences. For example, content may be anchored to a specific external object (e.g., a billboard, sign, tree, or other exterior feature), such that when a camera of the vehicle detects the external object, particular content is provided as part of the entertainment experience. For example, an external object may, in some examples, be an actor in a motion capture suit. When the actor is detected by sensors of the vehicle (e.g., cameras), displays (e.g., head up displays) may be utilized to alter the appearance of the actor for the occupants of the vehicle. Similarly, detection of certain conditions by GPS systems, external sensors (e.g., proximity sensors), cameras and the like may trigger various entertainment experiences or specific content of entertainment experiences.

The vehicle entertainment interface 202 may communicate with a vehicle control system 214 using various protocols. For example, the vehicle interface 206 may communicate with a dongle or other hardware coupled with a CAN or OBD-II port in the vehicle to communicate instructions to the vehicle. In some examples, the vehicle interface 206 may communicate wirelessly with the vehicle control system 214 using wireless protocols. For example, the vehicle interface 206 may format instructions from the translation layer 208 and/or the programming interface 204 in a JSON file transmitted to the vehicle control system 214 using an API of the vehicle. In some examples, the vehicle interface 206 may use other existing communications systems (e.g., ONSTAR systems) to communicate instructions to the vehicle control system 214.

The vehicle entertainment interface 202 may further utilize, include, and/or communicate with various sources of data used by the vehicle entertainment interface 202 to perform various functions. For example, the vehicle entertainment interface 202 may utilize databases or other datastores provided by automobile manufacturers to determine functionality and/or communications protocols of various vehicles utilizing the vehicle entertainment interface 202.

The vehicle entertainment interface 202 may communicate with external systems and/or devices using a variety of protocols, such as one or more networks. Components of the vehicle entertainment interface 202 may further communicate with one another using similar networks. In various embodiments, such networks or portions of networks may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like.

The components and architecture of the vehicle entertainment interface 202 shown in FIG. 2 are exemplary. In various examples, the vehicle entertainment interface 202 may include additional and/or different components not shown in FIG. 2.

Figure 3:
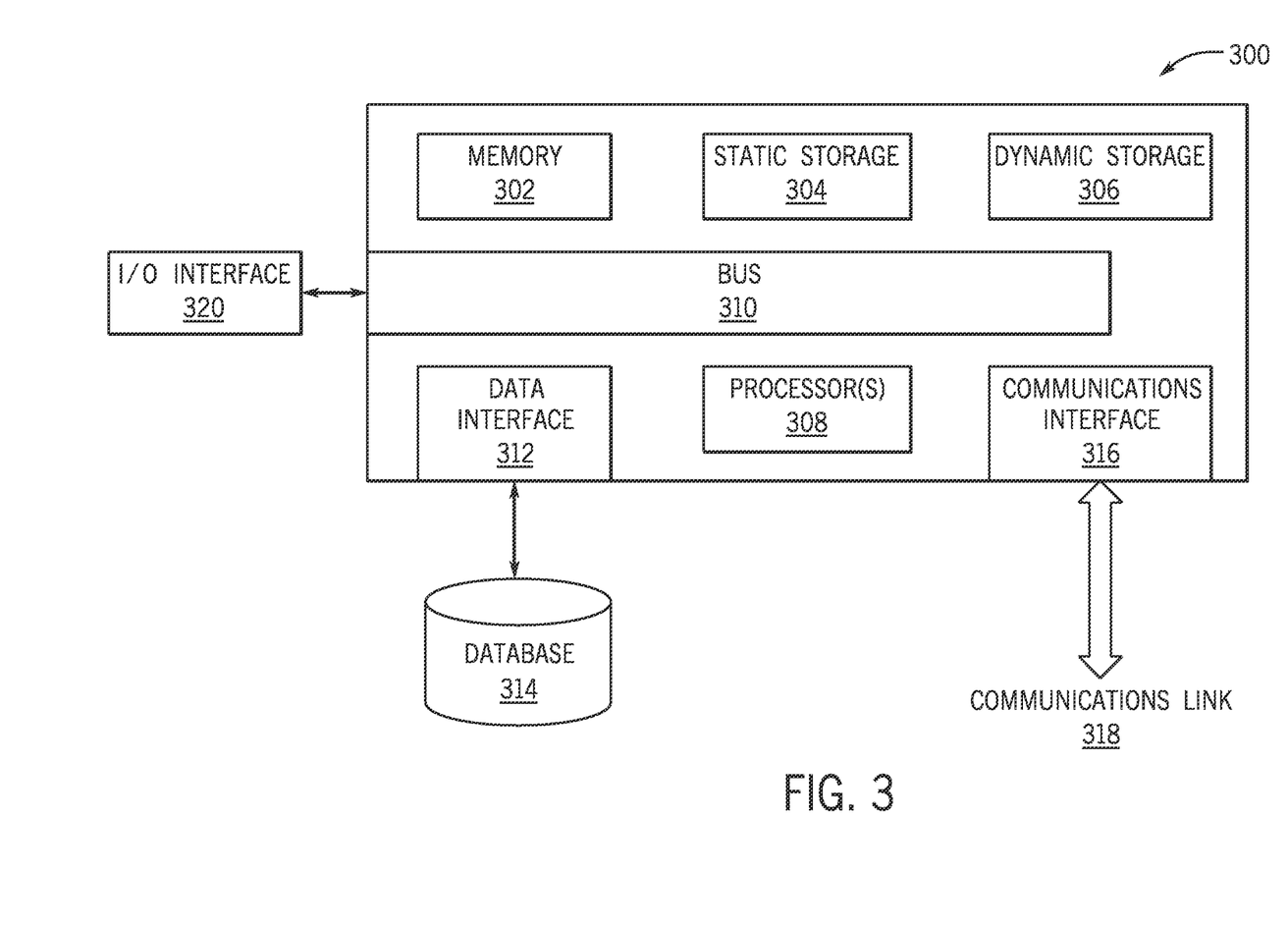
FIG. 3 is a block diagram of an example computer system implementing various embodiments in the examples described herein.

Turning to FIG. 3, an example computing system 300 may be used for implementing various embodiments in the examples described herein. For example, the vehicle entertainment interface 202 may be located at one or several computing systems 300. In various embodiments, user device 210 is also implemented by a computing system 300. This disclosure contemplates any suitable number of computing systems 300. For example, the computing system 300 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 300 may include one or more computing systems; be unitary or distributed; span multiple locations; span multiple machines; span multiple data centers; or reside in a cloud, which may include one or more cloud components in one or more networks.

Computing system 300 includes a bus 310 (e.g., an address bus and a data bus) or other communication mechanism for communicating information, which interconnects subsystems and devices, such as processor 308, memory 302 (e.g., RAM), static storage 304 (e.g., ROM), dynamic storage 306 (e.g., magnetic or optical), communications interface 316 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), and an input/output (I/O) interface 320 (e.g., keyboard, keypad, mouse, microphone). In particular embodiments, the computing system 300 may include one or more of any such components.

In particular embodiments, processor 308 includes hardware for executing instructions, such as those making up a computer program. The processor 308 circuitry includes circuitry for performing various processing functions, such as executing specific software for performing specific calculations or tasks. In particular embodiments, I/O interface 320 includes hardware, software, or both providing one or more interfaces for communication between computing system 300 and one or more I/O devices. Computing system 300 may include one or more of these I/O devices, where appropriate. One or more of these devices may enable communication between a person and computing system 300.

In particular embodiments, communications interface 316 includes hardware, software, or both providing one or more interfaces for communication (such as, for example, packet-based communication) between computing system 300 and one or more other computer systems or one or more networks. One or more memory buses (which may each include an address bus and a data bus) may couple processor 308 to memory 302. Bus 310 may include one or more memory buses, as described below. In particular embodiments, one or more memory management units (MMUs) reside between processor 308 and memory 302 and facilitate access to memory 302 requested by processor 308. In particular embodiments, bus 310 includes hardware, software, or both coupling components of the computing system 300 to each other.

Accordingly to particular embodiments, computing system 300 performs specific operations by processor 308 executing one or more sequences of one or more instructions contained in memory 302. For example, instructions for the programming interface 204, translation layer 208, and/or the vehicle interface 206 may be contained in memory 202 and may be executed by the processor 208. Such instructions may be read into memory 302 from another computer readable/usable medium, such as static storage 304 or dynamic storage 306. In alternative embodiments, hardwired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 308 for execution. Such a medium may take many forms, including but not limited to nonvolatile media and volatile media. Non-volatile media includes, for example, optical or magnetic disks, such as static storage 304 or dynamic storage 306. Volatile media includes dynamic memory, such as memory 302.

Computing system 300 may transmit and receive messages, data, and instructions, including program, e.g., application code, through communications link 318 and communications interface 316. Received program code may be executed by processor 308 as it is received, and/or stored in static storage 304 or dynamic storage 306, or other storage for later execution. A database 314 may be used to store data accessible by the computing system 300 by way of data interface 312. For example, experience data 210 may be stored using a database 314. In various examples, communications link 318 may communicate with, for example, user devices to display user interfaces to the vehicle entertainment interface 202.

Figure 4:
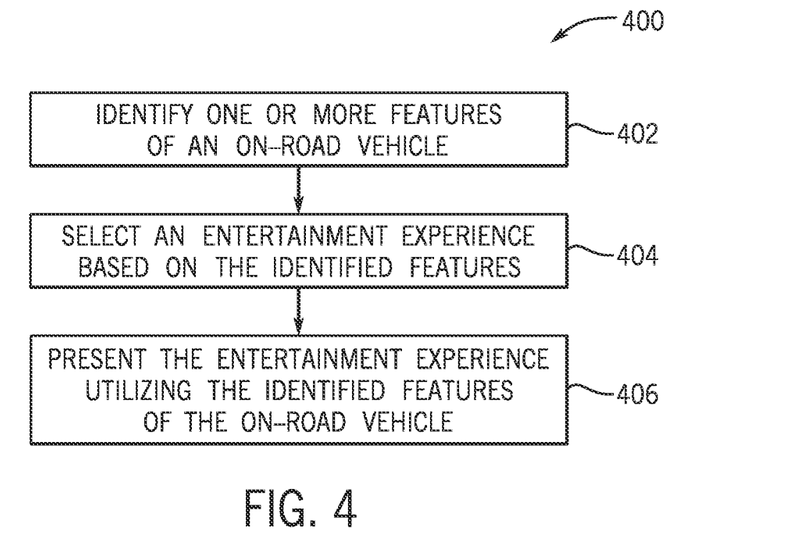
FIG. 4 illustrates an example method for providing an entertainment experience to occupants of an passenger vehicle utilizing the vehicle entertainment interface, in accordance with various embodiments of the disclosure.

FIG. 4 illustrates an example method 400 for configuring an providing an entertainment experience to occupants of an passenger vehicle utilizing the vehicle entertainment interface. At block 402, the vehicle entertainment interface 202 identifies one or more features of an passenger vehicle. In various examples, the vehicle entertainment interface 202 may determine a make and model of the vehicle in order to determine available features. For example, the vehicle interface 206 may receive a vehicle identifier or other information from a vehicle to identify the type of vehicle. In some examples, a user device (e.g., user device 216) of an occupant of the vehicle may be utilized to provide information about the vehicle. For example, a user interface may be provided to the vehicle entertainment interface 202, and the user may select, using the user device 216, the make and model of the vehicle.

In some examples, the vehicle interface 206 may query the vehicle (e.g., via an API provided by the vehicle) to determine what features are available for providing entertainment experiences. In some examples, availability of a particular feature may be dependent on a state of the vehicle. For example, where the vehicle is in motion, exterior lighting features (e.g., headlights and tail lights) may be unavailable to provide content.

The vehicle entertainment interface 202 may further utilize additional information about the vehicle or occupants of the vehicle (e.g., stored at experience data 210) to determine available features. For example, user profile information associated with an occupant of a particular vehicle may include identification of features of the vehicle which have been disabled or are otherwise unavailable for use by the vehicle entertainment interface 202. For example, a user may specify that, while the vehicle has a head up display, the user does not wish to provide access to the head up display for purposes of providing entertainment experiences.

The vehicle entertainment interface 202 selects an entertainment experience based on the identified features at block 404. In various examples, the vehicle entertainment interface 202 may store programs created using the programming interface 204 (e.g., at experience data 210). The vehicle entertainment interface 202 may select a particular program based on, for example, a location of the vehicle, a selection of an entertainment experience provided via a user device, an identification of external content playing near the vehicle (e.g., a movie) and the like. In some examples, the vehicle entertainment interface 202 may then select an available program based on which features are utilized by the program to generate the entertainment experience. For example, a content provider may, using the programming interface 204, provide a program specifically tailored to a set of available vehicle features. In some examples, the content provider may, using the programming interface 204 provide several discrete versions of an entertainment experience corresponding to different sets of features. In these examples, the vehicle entertainment interface 202 (e.g., the translation layer 208) may select a program matching the identified features.

At block 406, the vehicle entertainment interface 202 presents the entertainment experience utilizing the identified features of the passenger vehicle. After a program corresponding to a particular entertainment experience is identified, the translation layer 208 and/or the vehicle interface 206 may format the entertainment experience for communication to a vehicle. For example, the translation layer 208 may translate commands of a program to a format utilized by an API of a vehicle and/or otherwise format the entertainment experience before providing the entertainment experience to the vehicle interface 206. The vehicle interface 206 may then provide the entertainment experience to the vehicle by communicating with the vehicle control system 214.

Figure 5:
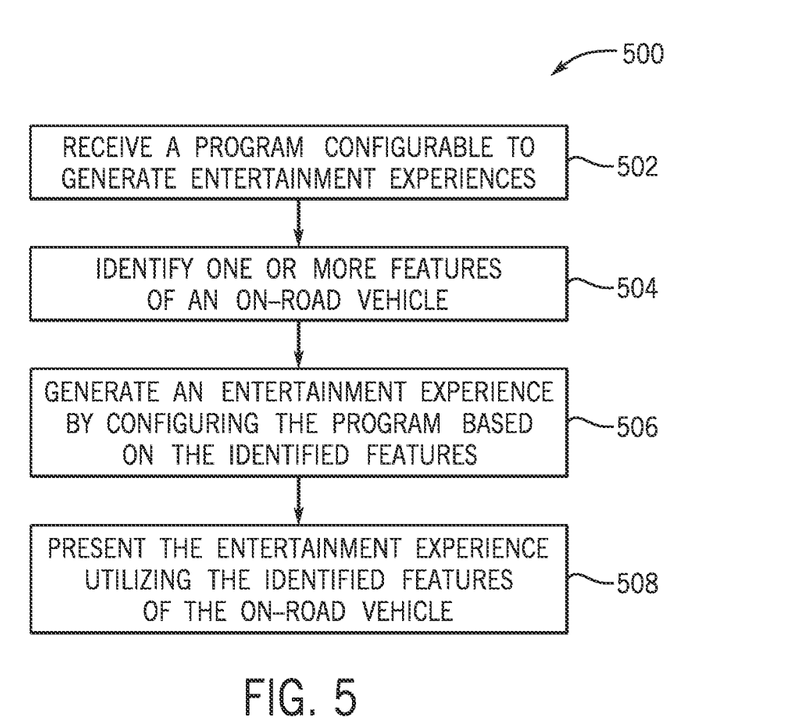
FIG. 5 illustrates an example method for configuring and providing an entertainment experience to occupants of an passenger vehicle utilizing the vehicle entertainment interface, in accordance with various embodiments of the disclosure.

FIG. 5 illustrates an example method for configuring and providing an entertainment experience to occupants of an passenger vehicle utilizing the vehicle entertainment interface. At block 502, the vehicle entertainment interface 202 receives a program configurable to generate entertainment experiences. The program may generally be received from a content creator, designer, developer, or other user via the programming interface 204 of the vehicle entertainment interface 202. In some examples, the program provided via the programming interface 204 may include content to be provided in an entertainment experience, features of vehicles which may be utilized to provide such content, timestamps, GPS coordinates, or other indicators of when to provide such content, and the like. For example, programs may include specific GPS coordinates or physical locations when content should be provided to occupants of the vehicle. For example, a user (e.g., utilizing a user device 212 or other device accessing the vehicle entertainment interface 202) may choose specific points along a route for content to appear to occupants of the vehicle, such as icons or other images displayed on various displays of the vehicle. In various examples, GPS coordinates and/or other indicators used by the programs may be provided by software in communication with the vehicle entertainment interface 202, such as third-party mapping software.

In various examples, such a program may include alternative features which may be utilized to provide content of an entertainment experience, depending on which features are available at a particular vehicle. For example, the program may specify that, preferably, a first content (e.g., content 106 in FIG. 1) is displayed using a head up display of a vehicle. Where a vehicle does not have a head up display, or where the head up display is not available to provide output for an entertainment experience, the program may specify that another display of or within the vehicle, such as a display of an infotainment system or user device, may be utilized to display the content.

In some examples, the vehicle entertainment interface 202 may store programs received via the programming interface 204 at various locations local to or accessible by the vehicle entertainment interface 202. Such programs may be associated with identifiers, such as particular pieces of external content (e.g., advertisements, movies, live shows, and the like), locations, associated characters, and the like which the vehicle entertainment interface 202 may utilize to retrieve the programs in specific situations (e.g., retrieving a program for a particular location when the vehicle is at that location).

The vehicle entertainment interface 202 identifies one or more features of an passenger vehicle at block 504. The vehicle entertainment interface 202 may identify the features of the passenger vehicle using the same or similar methods described with respect to block 402 of the method 400 described in FIG. 4. For example, available features may be identified using information provided by a user device (e.g., user device 216 of FIG. 2) and/or stored information about features available in particular makes and models of vehicles, as well as features that are designated as available by an owner and/or occupant of the passenger vehicle. Further, in some examples, the vehicle interface 106 may query an API of the vehicle to determine what features are available.

At block 506, the vehicle entertainment interface 202 generates an entertainment experience by configuring the program based on the identified features. Configuration of the program may generally include selection of instructions for output of content and/or collection of information based on the features available for the particular vehicle. For example, where visual output is preferably provided on a head up display or may be alternatively provided on a display of an infotainment system, the program may be configured, for a vehicle without a head up display but with an infotainment system, to include commands or instructions for providing the visual content via a display of the infotainment system. Similarly, where a program includes elements triggered by the vehicle being a particular location (e.g., visual elements intended to overlay over an external environment), the un-configured program may include instructions for obtaining location information preferably using GPS receivers built into the vehicle, or alternatively using GPS receivers of user devices communicatively connected to the vehicle. To configure the program for a vehicle without built in GPS receivers, the vehicle entertainment interface 202 may configure the program to include the instructions for obtaining GPS coordinates from one or more user devices communicatively connected to the vehicle.

In various examples, the program may be configured based on additional factors. For example, the program may be configured based on user preferences or user profile information. Where a user specifies a preference for captions where audio content is provided, the program may configured to display such captions on a head up display, infotainment system display, or other displays of the vehicle. Similarly, different versions of an entertainment experience may be provided based on user demographics or other preferences. For example, a user may specify a target age group or content rating and the program may be configured to create an entertainment experience geared towards the provided age group or content rating.

In various examples, configuring the program may further include translating the commands and/or instructions provided via the programming interface 204 to a format or syntax compatible with an API of the vehicle. For example, the translation layer 108 may translate commands and/or instructions of the configured program to a syntax compatible with the vehicle API based on identification of the vehicle and/or stored information about communications protocols utilized by various makes and/or models of vehicles.

The vehicle entertainment interface 202 presents the entertainment experience utilizing the identified features of the passenger vehicle at block 508. Generally, the configured program is provided to the vehicle control system 214 by the vehicle interface 206. The vehicle control system 214 may then provide instructions to components of the vehicle to provide content to occupants of the vehicle in the manner specified by the configured program. The vehicle control system 214 may further communicate with sensors, receivers, and/or other components of the vehicle to gather data or other information used to provide the entertainment experience. For example, cameras of the vehicle may be used to identify external features or structures, such as road signs, pavement, and the like, where the entertainment experience includes content to be visually overlaid over such features or structures.

In some examples, input from cameras or other sensors available in the vehicle may be further utilized to provide the entertainment experience. For example, a camera may provide information related to where occupants of the vehicle are looking, and content may be presented in corresponding areas (e.g., particular displays or areas of a display).

Figure 6:
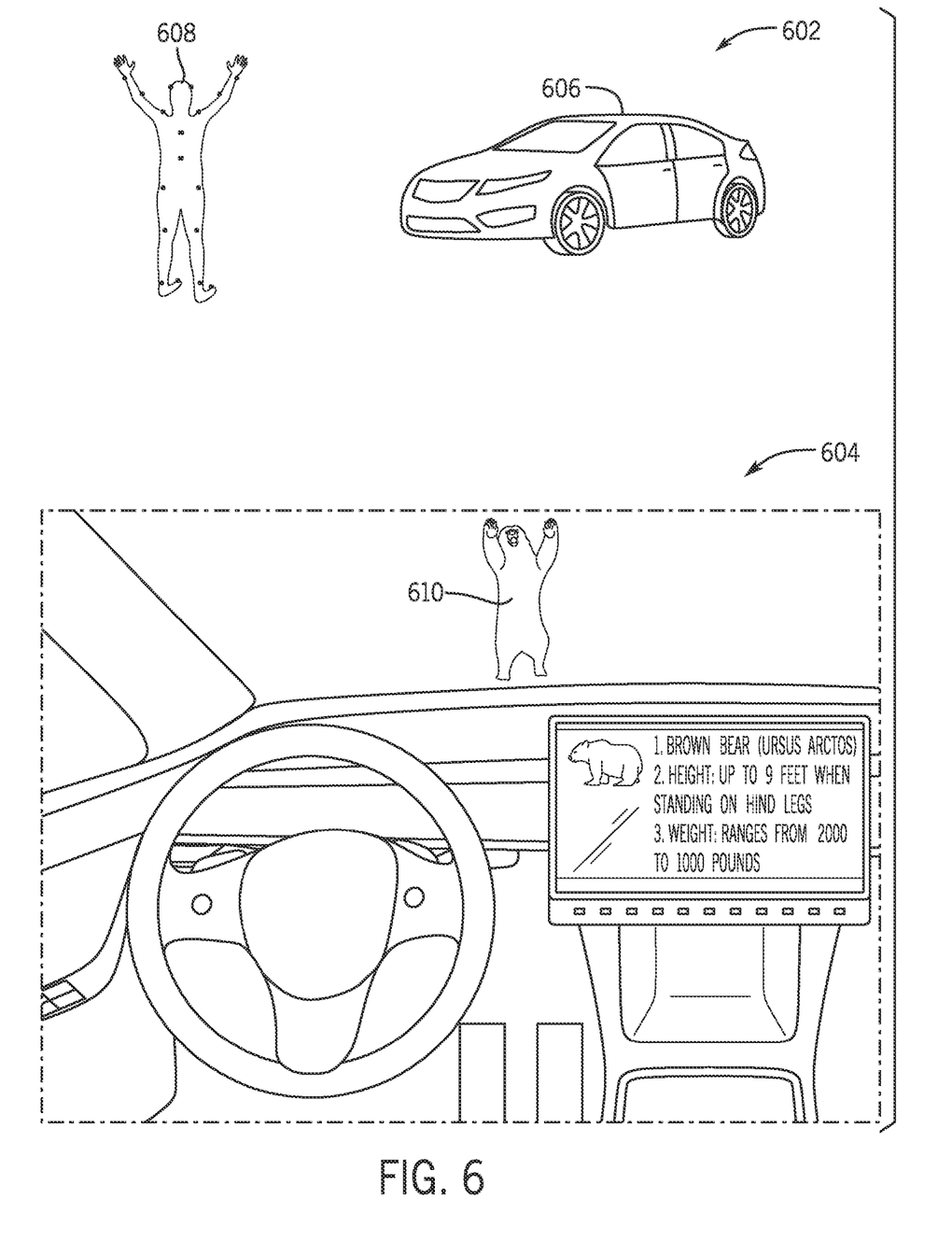
FIG. 6 illustrates an example entertainment experience provided to occupants of an passenger vehicle using the vehicle entertainment interface, in accordance with various embodiments of the disclosure.

FIG. 6 illustrates an example entertainment experience provided to occupants of an passenger vehicle using the vehicle entertainment interface 202. For example, the entertainment experience may be configured to alter, from the perspective of occupants of the vehicle, the appearance of an object outside of the vehicle. For example, in view 602, an actor 608 is positioned outside of the vehicle 606 wearing a motion capture suit. The entertainment experience may be configured such that, when sensors of the vehicle 606 (e.g., external cameras of the vehicle 606) detect the actor 608, the occupants of the vehicle 606 may see an altered version of the actor 608. For example, as shown in view 604, the occupants of the vehicle 606 may see a bear 610 overlaid over the actor 608 using a display embedded in the windshield of the vehicle 606. The bear 610 may generally move, from the perspective of the occupants, as the actor 608 moves.

In accordance with the above description, a vehicle entertainment interface is provided which may allow for greater adoption of entertainment experiences provided using personal passenger vehicles. For example, developers or content creators may be able to utilize one interface to design and/or develop entertainment experiences that can be adapted and/or configured by the vehicle entertainment interface for display by a wide variety of vehicles, including those with different features or components which may be used to provide entertainment experiences to occupants of the vehicle.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
   identifying one or more features of a passenger vehicle, wherein the identified one or more features comprise at least one of a heating feature of the passenger vehicle, an air conditioning feature of the passenger vehicle, or a lighting feature of the passenger vehicle;
   selecting an entertainment experience for presentation utilizing the one or more features of the passenger vehicle based on the identified one or more features of the passenger vehicle;
   configuring the entertainment experience based on an availability of the identified one or more features of the passenger vehicle; and
   presenting the entertainment experience to one or more occupants of the passenger vehicle utilizing the identified one or more features of the passenger vehicle, wherein presenting the entertainment experience comprises performing an operation utilizing at least one of the heating feature of the passenger vehicle, the air conditioning feature of the passenger vehicle, or the lighting feature of the passenger vehicle.

2. The method of claim 1, wherein the presenting the entertainment experience further comprises augmenting an appearance of an object outside of the passenger vehicle utilizing the identified one or more features of the passenger vehicle.

3. The method of claim 1, wherein the identified one or more features of the passenger vehicle further comprise at least one output feature and at least one sensor.

4. The method of claim 3, wherein presenting the entertainment experience further comprises presenting content utilizing the at least one output feature responsive to detection of a condition by the at least one sensor.

5. The method of claim 1, wherein the entertainment experience is selected from a plurality of entertainment experiences associated with a location of the passenger vehicle.

6. The method of claim 1, wherein presenting the entertainment experience further comprises presenting the entertainment experience in synchronization with content displayed outside of the passenger vehicle.

7. The method of claim 1, wherein the entertainment experience is further selected based on one or more user profiles associated with the one or more occupants of the passenger vehicle.

8. The method of claim 1, wherein configuring the entertainment experience based on the availability of the identified one or more features of the passenger vehicle comprises:
   determining a preferred feature of the identified one or more features of the passenger vehicle based on the entertainment experience;
   determining that the preferred feature is not available;
   determining an alternative feature of the identified one or more features of the passenger vehicle based on the entertainment experience;
   determining that the alternative feature is available; and
   configuring the entertainment experience based on the alternative feature.

9. A vehicle entertainment interface comprising:
   a processor;
   a memory;
   a programming interface configured to receive a plurality of programs which, when executed, provide respective entertainment experiences to one or more occupants of a passenger vehicle utilizing one or more features of the passenger vehicle; and
   a vehicle interface configured to:
      identify the one or more features of the passenger vehicle, wherein the identified one or more features comprise at least one of a heating feature of the passenger vehicle, an air conditioning feature of the passenger vehicle, or a lighting feature of the passenger vehicle,
      select a program of the plurality of programs based on the identified one or more features of the passenger vehicle,
      configuring an entertainment experience of the entertainment experiences corresponding to the selected program based on an availability of the identified one or more features of the passenger vehicle, and
      present the configured entertainment experience to the one or more occupants of the passenger vehicle utilizing the identified one or more features of the passenger vehicle, wherein presenting the configured entertainment experience comprises performing an operation utilizing at least one of the heating feature of the passenger vehicle, the air conditioning feature of the passenger vehicle, or the lighting feature of the passenger vehicle.

10. The vehicle entertainment interface of claim 9, wherein the vehicle interface is further configured to present the configured entertainment experience by providing instructions to the identified one or more features to augment an appearance of an object outside of the passenger vehicle.

11. The vehicle interface of claim 9, wherein configuring the entertainment experience of the entertainment experiences corresponding to the selected program based on the availability of the identified one or more features of the passenger vehicle comprises:
   determining a preferred feature of the identified one or more features of the passenger vehicle based on the entertainment experience;
   determining that the preferred feature is not available;
   determining an alternative feature of the identified one or more features of the passenger vehicle based on the entertainment experience;
   determining that the alternative feature is available; and
   configuring the entertainment experience based on the alternative feature.

12. The vehicle interface of claim 9, wherein the program is further selected based on one or more of a location of the passenger vehicle, a user profile associated with the one or more occupants of the passenger vehicle, and content being displayed outside of the passenger vehicle.

13. The vehicle interface of claim 9, further comprising a translation layer configured to translate the selected program from a first syntax associated with the programming interface to a second syntax associated with a control system of the passenger vehicle.

14. The vehicle interface of claim 9, wherein the vehicle interface is further configured to present the configured entertainment experience in synchronization with content displayed outside of the passenger vehicle.

15. One or more non-transitory computer readable media encoded with instructions which, when executed by one or more processors of a vehicle entertainment interface, cause the vehicle entertainment interface to:
   receive a program providing instructions associated with providing entertainment experiences to occupants of passenger vehicles;

identify one or more features of a passenger vehicle, wherein the identified one or more features comprise at least one of a heating feature of the passenger vehicle, an air conditioning feature of the passenger vehicle, or a lighting feature of the passenger vehicle;

generate an entertainment experience for presentation utilizing the one or more features of the passenger vehicle by configuring the program based on the identified one or more features of the passenger vehicle, wherein configuring the program comprises configuring the entertainment experience based on an availability of the identified one or more features of the passenger vehicle; and present the entertainment experience to one or more occupants of the passenger vehicle utilizing the identified one or more features of the passenger vehicle, wherein presenting the entertainment experience comprises performing an operation utilizing at least one of the heating feature of the passenger vehicle, the air conditioning feature of the passenger vehicle, or the lighting feature of the passenger vehicle.

16. The one or more non-transitory computer readable media of claim 15, wherein the one or more features of the passenger vehicle further comprise at least one output feature and at least one sensor.

17. The one or more non-transitory computer readable media of claim 16, wherein presenting the entertainment experience further comprises presenting content utilizing the at least one output feature and utilizing the at least one sensor to present the content.

18. The one or more non-transitory computer readable media of claim 15, wherein presenting the entertainment experience further comprises presenting the entertainment experience in synchronization with content displayed outside of the passenger vehicle.

19. The one or more non-transitory computer readable media of claim 15, wherein the program is further configured based on one or more user profiles associated with the one or more occupants of the passenger vehicle.

20. The one or more non-transitory computer readable media of claim 15, wherein the instructions further cause the vehicle entertainment interface to translate the program from a first syntax associated with the vehicle entertainment interface to a second syntax associated with a control system of the passenger vehicle.

21. The one or more non-transitory computer readable media of claim 15, wherein configuring the program based on the identified one or more features further comprises selecting instructions of the program corresponding to the identified one or more features.

22. The one or more non-transitory computer readable media of claim 15, wherein configuring the entertainment experience based on the availability of the identified one or more features of the passenger vehicle comprises:

determining a preferred feature of the identified one or more features of the passenger vehicle based on the entertainment experience;

determining that the preferred feature is not available;

determining an alternative feature of the identified one or more features of the passenger vehicle based on the entertainment experience;

determining that the alternative feature is available; and configuring the entertainment experience based on the alternative feature.

\* \* \* \* \*